US006938268B1

United States Patent
Hodge

(10) Patent No.: US 6,938,268 B1
(45) Date of Patent: Aug. 30, 2005

(54) VIDEO STREAM SHARING

(76) Inventor: Winston W. Hodge, 24300 Avenida de Marcia, Yorba Linda, CA (US) 92887

( * ) Notice: Subject to any disclaimer, the term of this patent is extended or adjusted under 35 U.S.C. 154(b) by 0 days.

(21) Appl. No.: 09/334,528

(22) Filed: Jun. 16, 1999

Related U.S. Application Data

(63) Continuation-in-part of application No. 09/227,030, filed on Jan. 7, 1999.
(60) Provisional application No. 60/072,004, filed on Jan. 21, 1998, and provisional application No. 60/070,739, filed on Jan. 8, 1998.

(51) Int. Cl.$^7$ .............................................. H04N 7/173
(52) U.S. Cl. ........................................ 725/93; 725/92
(58) Field of Search .............................. 725/87, 88, 89, 725/90, 91, 92, 93, 94, 95, 96, 97, 98, 100, 101, 102, 103, 104, 114, 115, 116, 117; H04N 7/173

(56) References Cited

U.S. PATENT DOCUMENTS

| 5,172,413 A | * 12/1992 | Bradley et al. ............. 725/121 |
| 5,247,347 A | 9/1993 | Litteral et al. |
| 5,410,343 A | 4/1995 | Coddington et al. |
| 5,414,455 A | 5/1995 | Hooper et al. |
| 5,421,031 A | * 5/1995 | De Bey ........................ 725/92 |
| 5,477,263 A | 12/1995 | O'Callaghan et al. |
| 5,512,934 A | * 4/1996 | Kochanski .................... 725/97 |
| 5,572,645 A | * 11/1996 | Dan et al. .................... 345/101 |
| 5,594,491 A | * 1/1997 | Hodge et al. ................ 725/103 |
| 5,600,364 A | 2/1997 | Hendricks et al. |
| 5,642,152 A | * 6/1997 | Douceur et al. .............. 725/97 |
| 5,724,646 A | * 3/1998 | Ganek et al. .................. 725/89 |
| 5,734,719 A | 3/1998 | Tsevdos et al. |
| 5,734,720 A | * 3/1998 | Salganicoff ................. 380/211 |
| 5,758,257 A | * 5/1998 | Herz et al. ................... 725/116 |
| 5,798,785 A | 8/1998 | Hendricks et al. |
| 5,838,314 A | 11/1998 | Neel et al. |
| 5,848,396 A | 12/1998 | Gerace |
| 5,886,995 A | 3/1999 | Arsenault et al. |
| 5,920,700 A | * 7/1999 | Gordon et al. ................ 725/92 |
| 5,969,714 A | * 10/1999 | Butcher ....................... 725/97 |
| 6,005,561 A | 12/1999 | Hawkins et al. |
| 6,028,599 A | 2/2000 | Yuen et al. |
| 6,543,053 B1 | * 4/2003 | Li et al. ....................... 725/97 |
| 6,564,381 B1 | 5/2003 | Hodge et al. |

* cited by examiner

*Primary Examiner*—Vivek Srivastava
(74) *Attorney, Agent, or Firm*—Bever, Hoffman & Harms, LLP; James E. Parsons

(57) ABSTRACT

A method and apparatus to allow multiple users to share a common stream of video information while providing each user the ability to have video-motion-control without interrupting the video program material viewed by the remaining users sharing the stream of video information. Also included is a method and apparatus to maximize the availability of video information in a given video content library which minimizing the storage media required to store the video information contained therein.

8 Claims, 8 Drawing Sheets

| ASSUMED TIME & NUMBER OF SUBSCRIBERS PER 30 SECOND WINDOW FOR MOVIES SHOWN | | | | | | | | | | | | | | |
|---|---|---|---|---|---|---|---|---|---|---|---|---|---|---|
| TIME IN SECONDS | 0 | 5 | 10 | 15 | 20 | 25 | 30 | 35 | 40 | 45 | 50 | 55 | 60 | TOTAL SUBS |
| FILM NAME | | | | | | | | | | | | | | |
| 20a ↘ MY BEST FRIEND'S WEDDING | 1 | 3 | 12 | 3 | 5 | 22 | 9 | 4 | 3 | 7 | 15 | 1 | 1 | 86 |
| 20b ↘ NOTHING TO LOOSE | 2 | 1 | 0 | 0 | 0 | 0 | 1 | 1 | 0 | 0 | 0 | 0 | 0 | 5 |
| 20c ↘ HOODLUM | 1 | 0 | 0 | 0 | 0 | 0 | 0 | 0 | 0 | 0 | 0 | 0 | 0 | 1 |
| 20d ↘ DEVIL'S ADVOCATE | 1 | 0 | 1 | 0 | 0 | 0 | 0 | 1 | 1 | 0 | 0 | 0 | 0 | 4 |
| 20e ↘ GEORGE OF THE GUNGLE | 1 | 0 | 0 | 0 | 0 | 0 | 0 | 0 | 0 | 0 | 0 | 0 | 0 | 1 |
| 20f ↘ SEVEN YEARS IN TIBET | 1 | 0 | 0 | 0 | 0 | 0 | 0 | 0 | 0 | 0 | 0 | 1 | 0 | 2 |
| 20g ↘ AIR FORCE ONE | 1 | 2 | 3 | 1 | 1 | 1 | 1 | 1 | 1 | 1 | 1 | 1 | 1 | 17 |
| AVERAGE HYPOTHETICAL IMPROVEMENT | | | | | | | | | | | | | | 16.57 |

Fig. 3

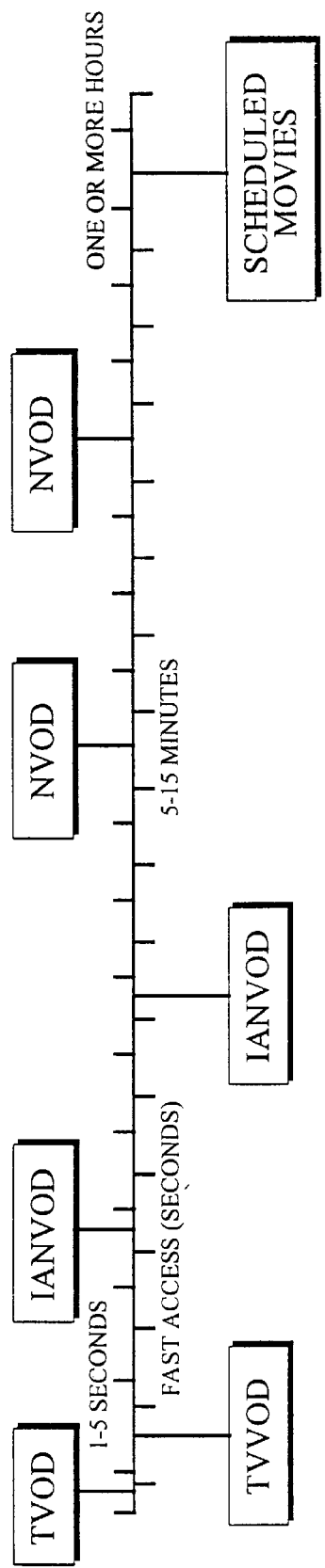

VIDEO STREAM SHARING

CROSS-REFERENCES TO RELATED APPLICATIONS

This application is a continuation of co-pending nonprovisional application Ser. No. 09/227,030, filed Jan. 7, 1999, entitled Video Stream Sharing, which is a nonprovisional application of U.S. provisional patent application Ser. Nos. 60/070,739, filed Jan. 8, 1998, and 60/072,004, filed Jan. 21, 1998, both of which are entitled "ALL DEMAND VIDEO SERVER," have Winston W. Hodge listed as an inventor and are assigned to StreamGate Video, Inc. patent application Ser. Nos. 09/227,030, 60/0070,739 and 60/072,004 are incorporated by reference in their entirety.

BACKGROUND OF THE INVENTION

The present invention relates to distribution of information either through broadcasting transmission over a local or wide area network, e.g., the Internet, or using cable video systems. More particularly, the invention provides a technique, including a method and apparatus, for scheduling distribution of video/audio information so as to maximize viewer ship of the same and, therefore, profits.

High speed networking and mass storage technologies have made possible interactive communication networks which provide consumers with video/audio information. Broadcast, video-on-demand, pay-per view, cable and Internet services are some of the best known services for providing consumers with programming choices ranging from movies to interactive games. FIG. 1 shows the major components of a video on demand service. The video programs, such as movies, are typically stored in one of various formats at a central server 10. Subscribers 12 submits requests to the server 10 for particular programs over a communications network 14. The communications network 14 may use any transmission medium, e.g. commercial telephone, cable and satellite networks. Upon receiving a request, server 10 retrieves the video program from mass storage and delivers a data stream, corresponding to the frames of the movie, to the requesting subscriber via distribution network 14. The data stream is directed to a receiver possessed by the subscriber which converts the data stream into signals necessary for playback and viewing of the movie.

With conventional video-on-demand video distribution, a library of content for selection by the user and complete Video Motion Control (VMC) is provided. VMC features typically include functions such as pause, fast forward, forward scan, reverse and reverse scan. Additional enhancements made possible via digital VMC implementation could include scene and chapter searches, searches for specific content, content related shopping and research, and other database type functions. To that end, conventional video-on-demand, conventionally known as true video on demand, dedicates a single session or communication pathway between the viewer and his movie. The communication pathway typically consists of dedicated video streams from a recording medium, such as a disk, dedicated communications channels, switching infrastructure, local neighborhood nodes, and set top boxes, disposed proximate to the local neighborhood nodes.

The dedication of communication pathways limits the number of customers that may be serviced by a providers, thereby reducing the revenue that may be generated. The number of viewers that may receive a common stream of video information, and the components and subsystems needed to transmit the same, is limited to a single user. As a result, the prior art is replete with systems and methods of maximizing the revenue generated by a given bandwidth of transmission channels. For example, U.S. Pat. No. 5,758,257 to Hertz et al. and U.S. Pat. No. 5,734,720 to Salganicoff each discloses a system and a method for scheduling receipt of desired movies and other forms of data from a network which simultaneously distributes many sources of such data to many customers, as in a cable television system. Customer profiles are developed for the recipient describing how important certain characteristics of the broadcast video program, movie or other data are to each customer. From these profiles, an "agreement matrix" is calculated by comparing the recipient's profiles to the actual profiles of the characteristics of the available video programs, movies or other data.

U.S. Pat. No. 5,594,491 to Hodge et al., assigned to the assignee of the present invention, discloses a system and method for distributing video over ADSL telephone lines. To maximize usage of the bandwidth provided by a system storing the information to be distributed, Hodge et al. advocate implementing a Near-Video-On Demand (NVOD) protocol. The NVOD protocol maps a video program onto a disk-drive in an interleaved fashion so that the video program is divided into data packets having a plurality of frames with each pair of adjacent frames corresponding to a pair of frames in a viewing sequence displaced from one another by a predetermined number of frames. Mapping the video frames in this manner renders the system compatible with existing video distribution systems, while maximizing the number of users that may access any given program.

U.S. Pat. No. 5,172,413 to Bradley et al. describes, in pertinent part, use of a central electronic library to store and deliver high-demand entertainment programming to local community electronic libraries that channel the programming to subscribers.

Low-demand programming is stored and delivered directly from a local community electronic library located in an area in which there may be a special interest in the programming. In this manner, Bradley et al. maximize access capacity while minimizing investment cost.

U.S. Pat. No. 5,421,031 to De Bey describes, in pertinent part, a video-on-demand system in which a video program disposed on a non-volatile storage device in divided into a plurality of segments. The segments are transmitted to each subscriber as a redundant sequence. The sequence is transmitted in accordance with a scheduling algorithm that ensures all the video segments of the video program are received by the subscriber to enable continuous playback in real-time of the video program. In this manner, the segments typically correspond to a non-contiguous sequence of video frames. The receiver, possessed by the subscriber, includes a buffer having sufficient memory to store a sufficient amount of video segments to ensure the subscriber experiences real-time playback of the video program.

What is needed, however, is a system and method for maximizing the number of users that may share a common communication pathway of data.

SUMMARY OF THE INVENTION

The present invention provides a method and apparatus to allow multiple users to share a common stream of video information while providing each user the ability to have video-motion-control without interrupting the video program material viewed by the remaining users sharing the stream of video information. Also included is a method and apparatus to maximize the availability of video information in a given video content library while minimizing the storage media required to store the video information contained therein.

BRIEF DESCRIPTION OF THE DRAWINGS

FIG. 3 is a table demonstrating the increase in users per channel employing stream sharing using the architecture shown above in FIG. 2;

FIG. 9 is a graph showing the different video distribution techniques that may be achieved by the all demand video architecture shown above in FIG. 8.

DESCRIPTION OF THE SPECIFIC EMBODIMENTS

Figure 1:
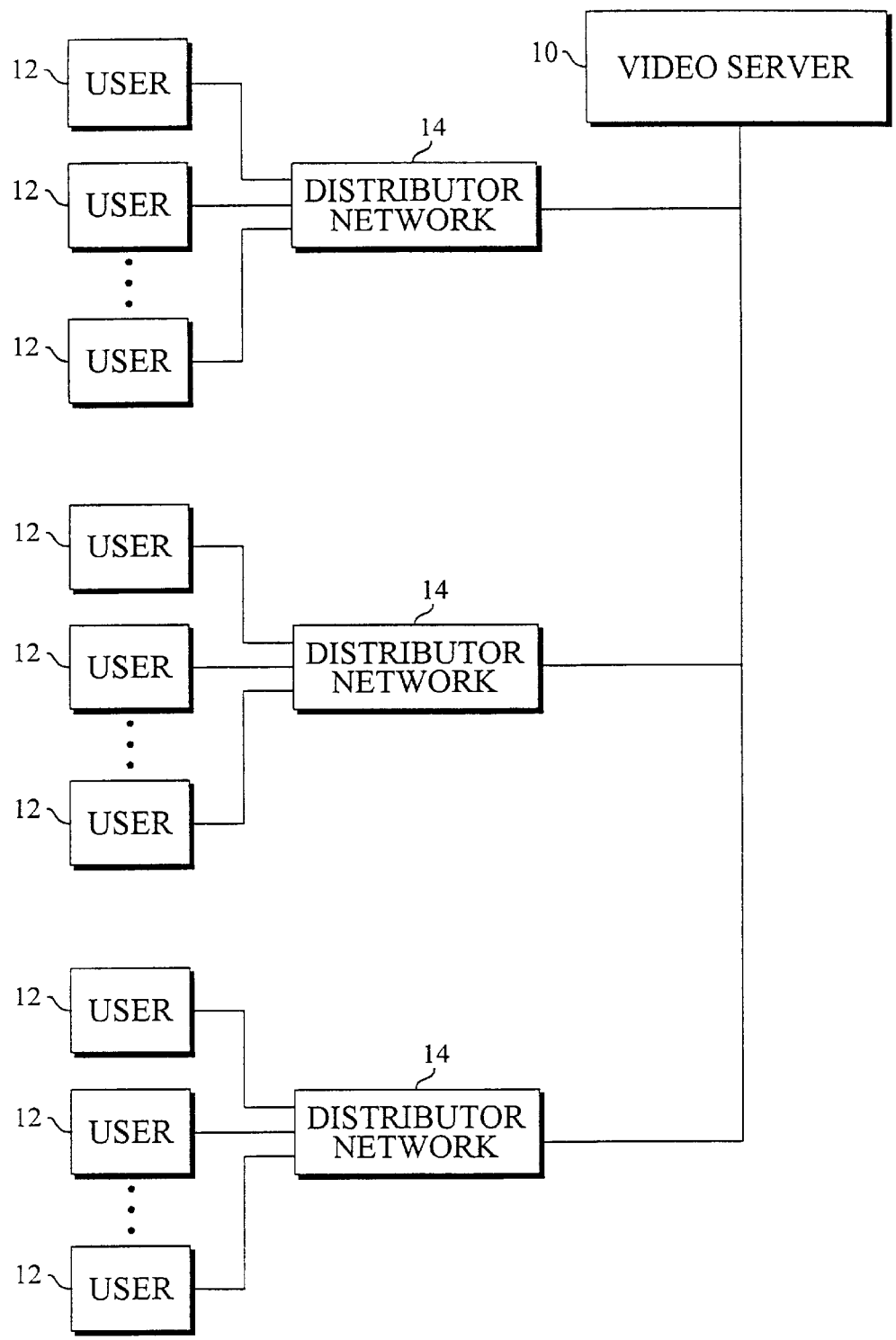
FIG. 1 is a simplified block diagram of a prior art video-on-demand distribution system.
Figure 2:
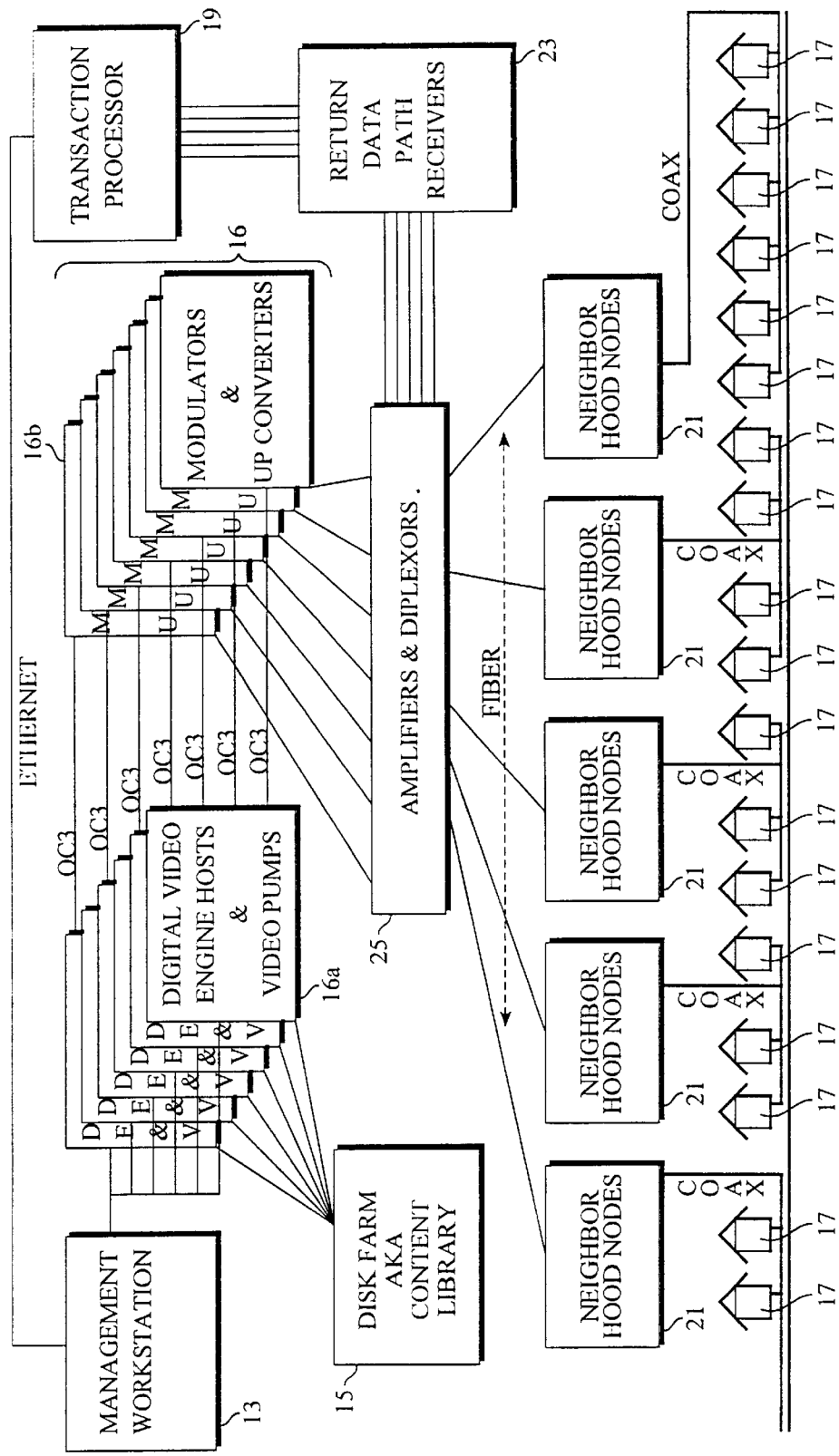
FIG. 2 is a simplified block diagram of a multi-session video-on-demand architecture.

Referring to FIG. 2, an embodiment of a multi-session video-on-demand architecture includes a management workstation 13 in data communication with one or more video distribution systems 16. The video distribution systems 16 are in data communication with one or more end users 17. Both the management workstation 13 and the video distribution systems 16 may be remotely located with respect to the end users 17. To that end, the management workstation 13 typically includes one or more processors and associated cache memory and related computer peripheral components that are in data communication with each of the video distribution systems 16 via, for example, an Ethernet connection. Each video distribution systems 16 includes a digital video engine host/video pump DVEH/VP 16a and a modulator/up-converter 16b in data communication therewith via an OC3 link. The video distribution systems 16 are in data communication with the end users 17 over an existing communication infrastructure, such as the Internet, cable network system, television broadcast network or satellite. A disk farm 15, or content storage library, contains video programs to be streamed to users 17. It should be understood that video programs are meant to include any type of digital information such as movies, JPEG files, sound files and the like. The DVEH/VP 16a can saturate a 155 megabits per second OC3 optical delivery pipe that translates to approximately eight to twenty video streams. When more than the eight to twenty video streams are typically required for a given video program, multiple DVEH/VP 16a are required to distribute the video program in the video library 15. One or more of the DVEH/VP 16a may be dedicated to feeding a single group of users 17 linked to a common neighborhood node. This architecture provides the ability to transmit any video program to any user 17 subscriber via the DVEH/VP 16a's integrated PCI bus time division multiplexing and by the by the space division facility of the N by M SCSI disk controller switches.

A transaction processor 19 is also in data communication with the management workstation 13 via an Ethernet link. The transaction processor 19 is connected to receive requests from users 17 via neighborhood nodes 21 in data communication with the transaction processor 19 through return data path receivers 23 and amplifiers and diplexors 25. The management workstation 13 may consist of one or more computers and functions to distribute information to the video distribution systems 16 and control operation of the same, such as content installation, play rule determination, barker channel (advertisements) preparation, accounting, maintenance and the like. As a result, the management workstation 13 classifies requests as either requests for video content or video motion control and prioritizes the requests to determine the most efficient communication pathway, i.e., which video distribution system 16, over which to transmit the video content to the subscriber. Optimization of the communication pathway is computed by the management workstation 13, with instructions sent to the appropriate DVEH/VP 16a to be executed by the same.

Video-motion-control requests are also transmitted to the management workstation 13 which then determines management workstation resources that may be allocated to the user 17 transmitting this request. To that end, the management workstation allocates a subset of available bandwidth of the communication link between the management workstation 13, the DVEH/VP 16a and the user 17 to facilitate video motion control. Upon termination of the video motion control bandwidth, the video motion control resource is returned to the video motion control resource pool.

Important in determining the efficient communication pathway over which to transmit information is ensuring that multi-session streaming, i.e., shared video streaming is facilitated. To that end, the management workstation 13 selects the communication pathway to maximize the number of users 17 that commence viewing of a program concurrently. In this fashion, the number of users 17 that may view a video program is maximized while minimizing resources, such as video distributions systems 16, necessary transmit video content to the users 17.

For example, assume a multi-session video architecture supports 100,000 users 17 and stores 100 different video programs in the content library 15. On a given day, on a given hour, 10% of the subscribers request to view a video program. Assume that the video programs in the content library 15 are equally popular; therefore, 10,000 subscribers are selecting 100 video programs, i.e., or each video program is viewed by 100 subscribers. Assume further that video program surfing (browsing) is most prevalent a few minutes before and after the aforementioned hour, defining a window of viewing latency, and that each video program has a one minute interval consisting of an interesting frontal appendage, i.e., is not germane to the information, such as a plot/story-line of corresponding to the video program. This window of latency permits video stream sharing among multiple users 17 while waiting for the video program to commence.

Referring to both FIGS. 2 and 3, this example is further demonstrated assuming a user 17 requests to view the video program entitled "My Best Friend's Wedding" at a few moments after 8:03 PM. Five seconds later (8:03:05 PM), three additional users 17 transmit requests to view the same video program. At 8:03:10 PM, twelve additional users 17 select this video program and such selection continues until 86 viewers have requested to view "My Best Friend's Wedding" before information corresponding to this video program is transmitted to a user 17, e.g., before 8:04:00 PM, sixty seconds after a previous group of users 17 commenced viewing "My Best Friend's Wedding". In this manner, a window of viewing latency having a sixty second interval is provided in which multiple users 17 can be cobbled into group to share a common stream of video information. This provides a 16.5 multiplier of architecture efficiency, with is determined by summing the total active users and dividing by the number of required channels, in this example seven channels 20*a*, 20*b*, 20*c*, 20*d*, 20*e*, 20*f* and 20*g*, resulting in the 16.57 improvement factor, with a channel being defined as a stream of video data being transmitted to one or more users 17 during any given instance in time.

Sharing of a stream of video information among multiple users 17 reduces the cost required to distribute video information. Specifically, the number of communication pathways needed to distribute video information to users 17 is reduced while increasing the number of users 17 that can view video information over a single communication pathway. This reduces the quantity and complexity of the components and subsystems required to transmit video information while increasing a number of users that may receive the same. Although the foregoing has been described with respect to a window of viewing latency having a sixty second interval, in practice, an interval of any duration may be employed, such as 10 seconds, 20 seconds, 60 seconds or longer. As this interval is increased, more efficient utilization of the video-on-demand architecture and other resources is realized, but users 17 experience longer lag times between a request for video content and receiving video content.

The more stream sharing is utilized, the more efficient the video distribution architecture. With stream sharing capability, degradation will never be worse than single session video-on-demand. The ultimate degradation of multi-session video-on-demand converges to single session video-on-demand, and improves as more subscribers access the system. It should be noted that loading effects the efficiency of the multi-session video-on-demand architecture. The higher the loading, the higher the probability for stream sharing. Specifically, as the video-on-demand user 17 requests increase, the probabilities for increased architecture efficiency resulting from stream sharing increases significantly beyond that available with single-session video-on-demand architecture. At the other extreme, when neither video-on-demand architecture requires resources, none are allocated.

Figure 4:
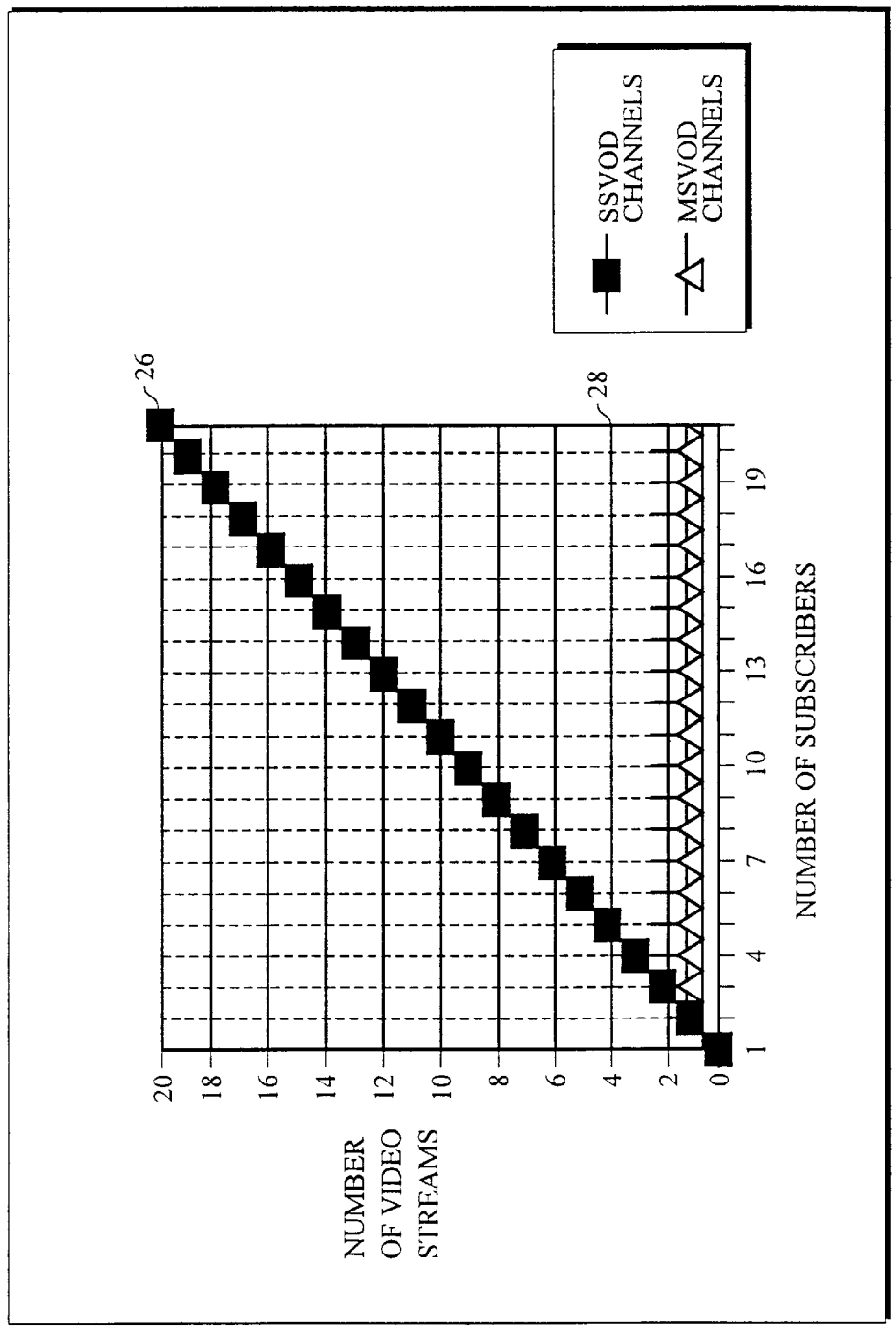
FIG. 4 is a graphical representation showing a comparison of the efficiency between single-session video-demand architecture vs. multi-session video-on-demand architecture.

Referring to FIGS. 2 and 4, single-session video-on-demand architecture is compared with multi-session video-on-demand with all users 17 selecting the same movie during a window of viewing latency. As can be seen by the slope of line 26, the number of channels required to transmit video program to users, in response to requests therefrom, is directly proportional to the number of users 17 for single-session video-on-demand architecture. The slope of line 28, however, indicates that the number of channels required is independent of the number of users 17 requesting to view the same. Request from users 17, however, may not be uniform, i.e., it will come in bunches. In this situation, the benefits provided by the multi-session video-on-demand architecture are greatly improved, dependent upon the statistical assumptions concerning the user 17 requests.

More particularly, the worst case statistical distribution for the multi-session video-on-demand architecture is the uniform distribution of user 17 requests, i.e., when the number of user 17 requests for a given video program is uniform, or common, over an allocated time interval. This is shown when it is assumed that subscribers have no notion of time and are not involved in otherwise scheduled broadcast events that start and terminate on multiples of half hours. Specifically, it is widely believed that once video-on-demand users 17 become accustomed to video-on-demand architecture, their interval time awareness, as it relates to Pay-Per-View (PPV) surfing (browsing) will converge to zero. If this is the case, then the bunchiness of multi-session video-on-demand is minimized, or non-existent. When this occurs, stream sharing continues to be beneficial, but its benefits are minimized. In this situation, multiple users 17 will share single streams information and therefore multi session will prevail as more efficient than single-session video-on-demand. Furthermore, a uniform distribution model of user 17 requests is an unlikely representation of viewing patterns. The uniform model is depicted on FIG. 5 as line 30.

Figure 5:
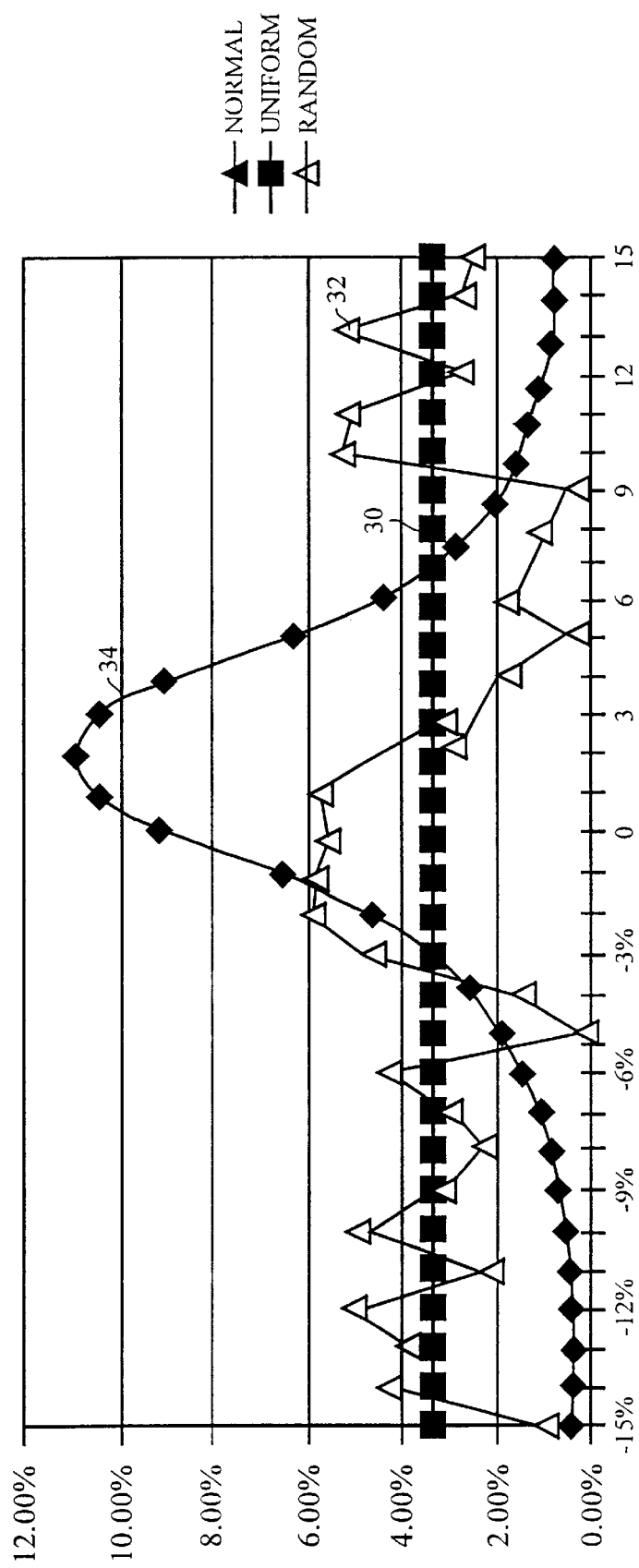
FIG. 5 is a graph depicting possible statistical viewing assumptions in accord with the present invention.

Referring to both FIGS. 2 and 5, the next statistical model employed to test the validation of multi-session video-on-demand is a purely random model, shown as line 32. The purely random model assumes the same number of total users 17 as the uniform model, except some time intervals have more users 17 transmitting requests than do the remaining time intervals, with the differences being random. In other words, the requests are bunched into certain time intervals. This actually improves the efficiency of the multi-session video-on-demand architecture, because some time intervals will have more users 17 associated with a common channel than other intervals. Some time intervals may not have any activity what-so-ever, thereby maximizing efficiency.

Ultimate bunching occurs when a normal distribution, shown as line 34, of the users 17 are sending requests is assumed. As shown, this distribution assumes that periodically, e.g., every half hour, more users 17 are likely to start sending requests, because the users 17 have just completed watching a video program, e.g., from perhaps a broadcast network. The distribution assumes that no user 17 is perfectly synchronized to transmit a request instantaneously after the aforementioned scheduled program terminated. These users might first undertake some domestic activity, e.g., obtaining food to eat, but are loosely synchronized in the transmission of request to the management workstation 13. Further randomness can occur by totally random events such as answering the door or phone. The subjection of the multi-session video-on-demand to this normal distribution provides more efficient use of the components and subsystems thereof, compared to single-session video-on-demand architectures. This is shown by comparing the area under each line 30, 32 and 34, that represents a number of users participating in stream sharing. The greater the number of sharing per unit time, the more efficient the architecture, with the area under all the lines 30, 32 and 34 being unity. Thus, to efficiently employ multi-session video-on-demand, a statistical model is derived to optimize efficient use of architecture resources while meeting the expected user 17 demand in much that same manner that the standard telephone company allocates the resources associated therewith.

Statistical modeling of information distribution systems is well known and exemplified by telephone companies. It is well known that telephone companies have insufficient capacity to simultaneously satisfy the requirements of all its customers. For example, if telephone company patrons attempted to use their telephone simultaneously, insufficient resources would exist to allow the patrons to complete a telephone call. As such, the telephone companies are organized to provide a cost effective approach to serve its customers based upon statistically calculated probabilities and expectations.

A similar statistical analysis is applied to the multi-session video-on-demand system to provide video-motion-control to the various users 17 thereof in a cost efficient manner which meeting statistically determined expectations of the users 17. The statistical model employed for multi-session video-on-demand is based upon certain operational assumptions. These assumptions are that not all users are using video-motion-control functionality concurrently; video-motion-control resources are separate resources managed independent of the video content distribution resources; a pool of video-content-control resources may be created which can be time shared among multiple users; and the shared finite video-motion-control pool is small compared to the users 17.

The most significant usage characteristics that determine the appropriate size of the video-motion control resource pool are the types of video-motion-control functions employed, the duration for which they are employed and the time, relative to the playing time of a video program, at which point they are employed. For example, a statistical model created indicates that only a maximum of a couple of minutes, on the average per video program, involves execution of certain basic video-motion-control functions: Play, Pause, Non Viewing Fast Forward and Non Viewing Reverse. These functions require minimal bandwidth of the multi-session video-on-demand resources, because no digital audio/video MPEG channel resource is required to be dedicated to a user 17. As such, the duration for which these video-motion-control functions are employed need not be entertained, because neither a video-motion-control-resource nor a video content distribution resource is required. Fewer architecture resources are required if a Pause function is employed, because neither video-motion-control resources nor video content distribution resources are required. Bandwidth need only be allocated to send a request to the management workstation 13 indicating at which frame where in the video program the user 17 invoked the aforementioned functionality. When the user terminates the functionality, bandwidth is required only to allow the management workstation 13 to find, or create, a video stream which will allow the users 17 to continue viewing the video program so that the same appears to the user 17 uninterrupted. Each of these requests takes only seconds. Similarly, non-viewing fast forward and reverse require only minimal architecture resources.

Complex video-motion-control functions, on the other hand, require a great deal more bandwidth. As such, the amount of video-motion-control resources is established as function of the Viewing Forward and Reverse usage. These functions include Viewing Fast Forward and Viewing Reverse. These functions require more bandwidth to execute, because a digital audio/video MPEG channel resource must be dedicated to a user 17 as well as the capacity via the return data pathway receiver 23. For example, if the average full function video-motion-control user 17 requires two minutes a video program employing these functions, and if the average video program duration is 100 minutes, then the average video-motion-control user 17 will require 2% of the architecture's systems resources which Viewing Fast Forward and Reverse, assuming a statistically uniform distribution.

Were the statistical distribution of user 17's implementation of video-motion-control functions not uniform, i.e., skewed or clustered, an assumption of 10% maximum concurrent utilization might be valid (5 times worse than expected). However, the uniform distribution may not be an unlikely distribution of video-motion-control functions, because even with asymmetric (spasmodic) user 17 video-motion-control usage, by virtue of the randomness between different video stream sequences and variations in user 17 viewing behavior, there should be a predisposition toward pure randomness, thereby contributing to a uniform distribution. Nonetheless, over-utilization of the multi-session video-on-demand architecture to occur would be exceedingly rare.

Many users 17 never employ video-motion-control except to pause for a movie (or employ non viewing fast forward and reverse). A simple poll of 20 users 17 substantiates this assumption, because 1% of these users 17 employed viewing video-motion-control functions on every video program. This further reduces the amount of required video-motion-control Resource.

Additionally, resources could be further shared if 15 second skips were implemented in viewing video-motion-control Forward and Reverse thereby permitting an additional compression of infrastructure by some small integer multiple (not 15 to one because only MPEG I frames would be transmitted, not B and P frames; and I frames are not as compressed as B and P frames).

Major moves forward and reverse into the movie could be provided without video-motion-control functions to further reduce the requirements on the multi-session video-on-demand architecture. This could include an EPG like chapter and scene search capability. For example, an intra-movie navigation menu could be displayed with a list of chapters and indexed specific content which could be directly selected and the system would take the user 17 to that chapter or topic.

Lastly, video-motion-control functions are not required for users not currently using pay-per-view video-on-demand. For example, assuming the percentage of video-on-demand users 17 active at one time is 15%, that only 50% of users 17 employ video-motion-control forward and reverse functions and that the amount of time these users 17 actually employ these functions is 2% of the viewing time. Then the percent of video-motion-control resources compared to video-on-demand video content distribution resources is only 1%.

In operation, the multi-session video-on-demand architecture is transparent to a user 17 in that its interface is similar to that of a conventional single-session video-on-demand architecture. The user 17 reviews an on-line menu or program guide of available programs displayed on a video screen and selects a program. Very quickly, the system responds with the selection and begins to play it. In addition to the user's ability to select content from a library of films or recorded events, the user 17 is able to execute typical video-motion-control. For example, were a user 17 sharing a common stream with others, the user is providing the functionality of pausing, fast-forwarding, or reversing the content of the video program that is in the stream, without disturbing the video program being viewed by the remaining users 17 sharing this common stream.

Upon executing a video-motion-control function, the user 17 is removed from the shared stream and given a private video-motion-control resource, as defined above, but only for as long as required. This limited private video-motion-control resource comes, for a short duration of time, i.e., a sub-portion of the bandwidth of the management workstation 13 video-motion-control pool, i.e., a large portion of bandwidth of the management workstation 13, that may be dedicated to other users 17 of the same channel. The short duration of time facilitates personal video-motion-control functionality to the specific user 17 only so long as needed and which is subsequently returned to the video-motion-control pool. In this manner, N video-motion-control resources may be shared by M users 17 at any one time and on any one channel, where "N"<<"M". Upon completion of video-motion-control, a user is switched to a stream of the video program, offset in time from the original stream, with the offset in time corresponding to the portion of the video program in the stream which was being viewed by the user at the completion of the video-motion-control function. In this manner, the video program associated with the stream of video information appears uninterrupted to the user 17. If no such video stream is present, the management workstation 13 simply creates a new video stream to achieve the uninterrupted perception of the video program associated with the video stream that is also made available to users 17, as required. Were overuse of the multi-session video-on-demand architecture to occur through, for example, excessive requests for video-motion-control functions, the multi-session video-on-demand architecture would display a message to the user 17 indicating that VMC Resource Were Not Available, and the video stream would continue uninterrupted.

Should more content streams be required than a single DVEH/VP 16a can produce, automatic shelf space allocation in the video library 15 would be carried-out. This may occur, for example, when more video programs were requested to be viewed by users than can be sold at any one time or than the disks or disk arrays can produce. The solution therefore is to have multiple copies of the movies on multiple disks or disk arrays available to multiple video pumps. Specifically, each DVEHNP 16a is fed video programs from one or more disks in the video library 15. Were a DVEH/VP 16a to utilize the entire capacity of a disk or disk array contained in the video library 15, multiple DVEH/VPs would require multiple disks or disk array duplicates of the same video program. Thus, to efficiently operate the multi-session video-on-demand architecture it is beneficial to ascertain the amount of additional copies of a video program that should be provided an stored within the video library 15, referred to as automatic shelf space allocation. Automatic shelf space allocation is a business model optimization paradigm facilitating content resources placement to be optimized to produce maximum revenue. Since content sales can vary hour by hour, day by day, holiday by non holiday, optimum shelf space allocation can vary accordingly. Therefore, a content management function incorporated into the management workstation 13 includes two categories: Dynamic-Shelf-Space-Allocation and Barker-Channel-Programming.

Dynamic-Shelf-Space-Allocation is achieved by an algorithm programmed into the management workstation 13 that specifics maximum shelf space for high grossing video programs while permitting low grossing video programs to have a lesser quantity of shelf space. The algorithm is referred to as the Motion Picture Shelf Space Allocation Algorithm (MPSSAA) and is computed to automatically to provide minimum copies of content and sufficient copies (shelf space) as expected for certain showings based upon the following parameters:

| | |
|---|---|
| actual system sales | A |
| gross theater sales | B |
| time content has been available to system (availability window) | C |
| hour of day | D |
| day of week | E |
| content genre | F |
| studio or operator minimum shelf space requirements | G |
| interfering real time events | H |
| number of available digital channels | I |
| scaling factors | J |
| local demographics | K |
| local content purchases | L |
| time | M |
| date | N |
| day of week or year | O |
| holiday | P |
| local operator shelf space preferences | Q | such that the optimum shelf space value (Z {V}) for specific content, where Z{V} is constrained by minimum and maximum total available shelf space such that:

Min Shelf Space <fZ{V}< Max Shelf Space but the specific computed shelf space value for each movie is:
I=m
Z{v}=f(A,B,C,D,E,F,G,H,I,J,K,L,P,Q,R,S,T)/n.
I=1 where n is a normalizing factor.

Figure 6:
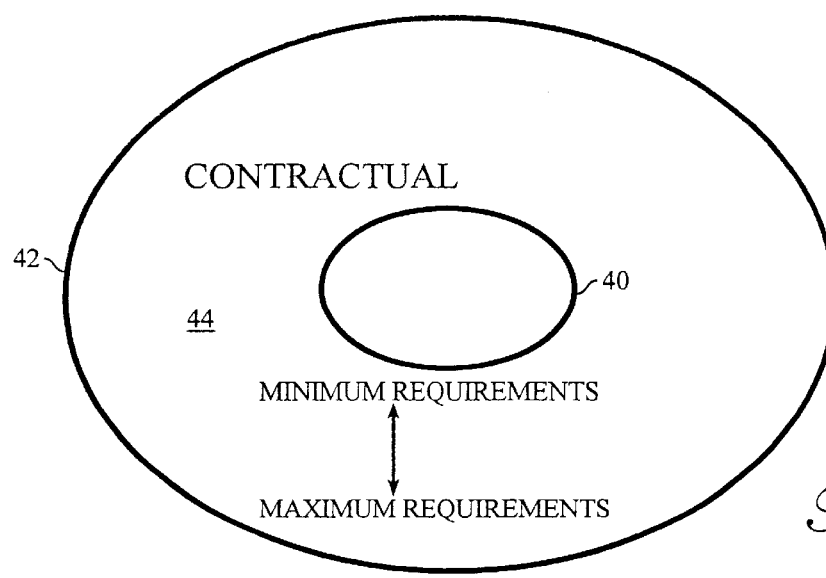
FIG. 6 is a graphical representation of contractual constraints which are quantified and operated on by the management workstation of FIG. 2.
Figure 7:
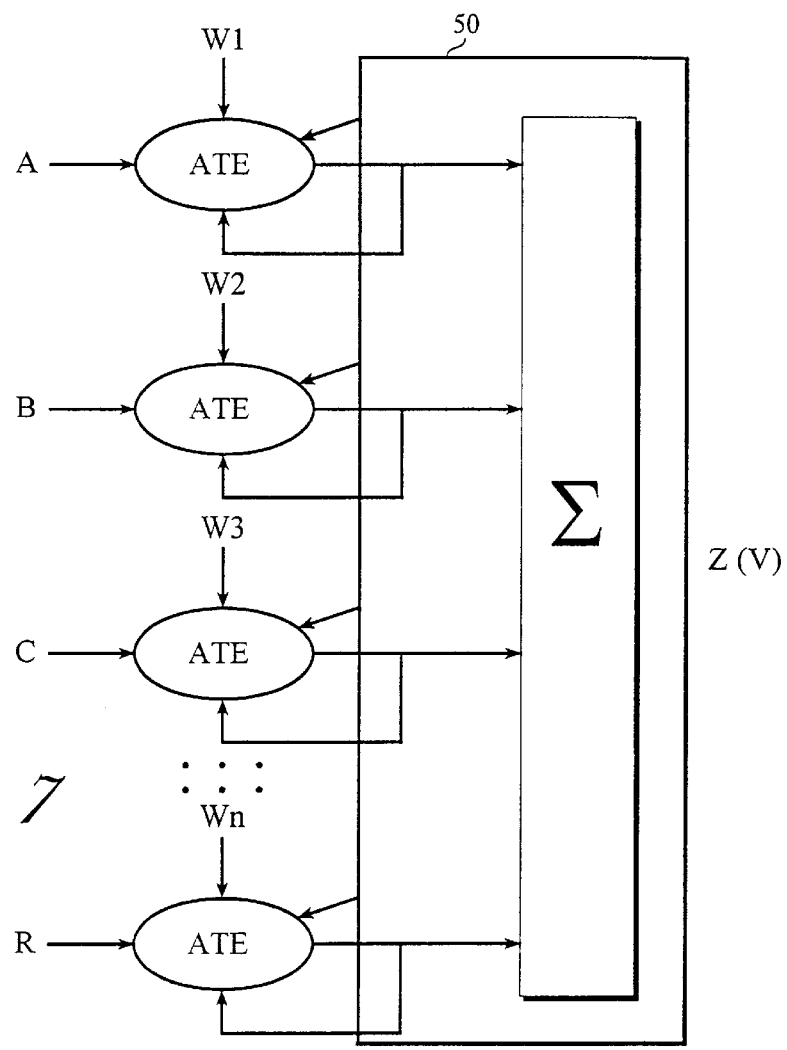
FIG. 7 is a multiple adaptive threshold element for automatic shelf space allocation, in accord with the present invention.

Referring to FIGS. 2 and 6, contractual constraints may be presented in which minimum values 40, corresponding to minimum shelf space that must be allocated, and maximum values 42 corresponding to maximum shelf space that must be allocated. The area 44 between the minimum 40 and maximum 42 values represents operational latitude for operators with respect to allocation of the shelf-space. The management workstation 13 is designed to optimize revenue generation while maintaining operational head end profits while operating within the operational latitude area 44, referred to as adapting room. This is achieved by dynamically adjusting the scheduling of programming material on the video distribution systems 16 so that, for example, the most profitable films are allocated the greatest amount of shelf space. Conversely, the least profitable video programs are given the least amount of shelf space. To that end, the management workstation includes a multiple adaptive threshold element, shown in FIG. 7 in which the parameters previously defined, A through R, are inputs to logic block 50. Automatically computed weights for each node weight the inputs appropriately. Each video program's input parameters are then multiplicity combined with the one set of weights computed for all video programs so that a set of shelf space values are created for each movie. One shelf space value is computed for each movie. These shelf space values are then ranked from minimum to maximum and shelf space is allocated accordingly.

The automatic adjustment of the weights is done iteratively during the system learning process, and as the system continues to learn how to automatically optimize shelf space allocation, the iterative changes to the individual weights becomes less and the system is said to be converging (to an optimum set of weights). Of course, when new movies are added, minor changes to the weights will again be required. This technology includes video-on-demand architectures that adapt automatically and architectures that adapt by group learning.

The shelf space algorithm system is designed to optimize operational head end profits while operating within the minimum and maximum shelf space restraints by using information to automatically hone the operation. Profit optimization is attained by providing the most profitable films the greatest opportunity to be selected (most shelf space) while providing the least profitable films the minimum shelf space within the minimum and maximum ranges specified.

These optimum shelf space values (Z{V}) are evaluated and ranked. There will exist one individual optimum shelf space value for each movie or program or event and one minimum optimum shelf space value. These individual optimum shelf space values (Z{V}) are then ranked according to their values and correlated to shelf spaces available.

The movie with the maximum optimum shelf space value is given the most shelf space while the movie with the minimum optimum shelf space values is given the least and movies with intermediate ranking are given shelf space accordingly.

As represented earlier, one important indicator of the some of the video programs' predicted success is the theater box office sales and another is the actual system sales logged via the operator's set top boxes. These are probably the two most important parameters, however additional system refinement is made possible by the other contributing parameters.

Some (but not all) of the elements of the optimum shelf space values are: pending real time events, theater box office sales, number of available digital channels, demographic factors, content purchased locally, time of day, day of week, local operator preferences, holidays, program duration, avail window and duration, Movie Reviewer Ratings, and the automatically adapting weights for each of these parameters. From these parameters, an electronic spread sheet (matrix) is assembled which automatically computes the optimum shelf space values (Z {V}) for each movie or event. The events are then sorted according to their optimum shelf space values (Z{V}) which has been scaled in a range from 1 to 10 where 10 is best.

Shelf space is allocated according to optimum shelf space values (Z {V}) by the ranking of the optimum shelf space values (Z {V}) and weighting them according experienced need for shelf space. In this manner, each movie can be assigned a fixed amount of shelf space and this shelf space allocation varies by time of day, actual sales, day of week, etc. Therefore, shelf space allocation can vary hourly, daily, or by other periodicity as desired by the operator.

The requirement exists for an automated Barker channel which is intelligent to the extent no advertising time is wasted showing Barkers (advertisements) for video programs started and which will not show again for some time. The Barker channel, whose purpose it is to advertise upcoming movies and/or events is most effective when heavy advertising immediately precedes the expected start of the relevant video program event and may be employed during the window of viewing latency.

Figure 8:
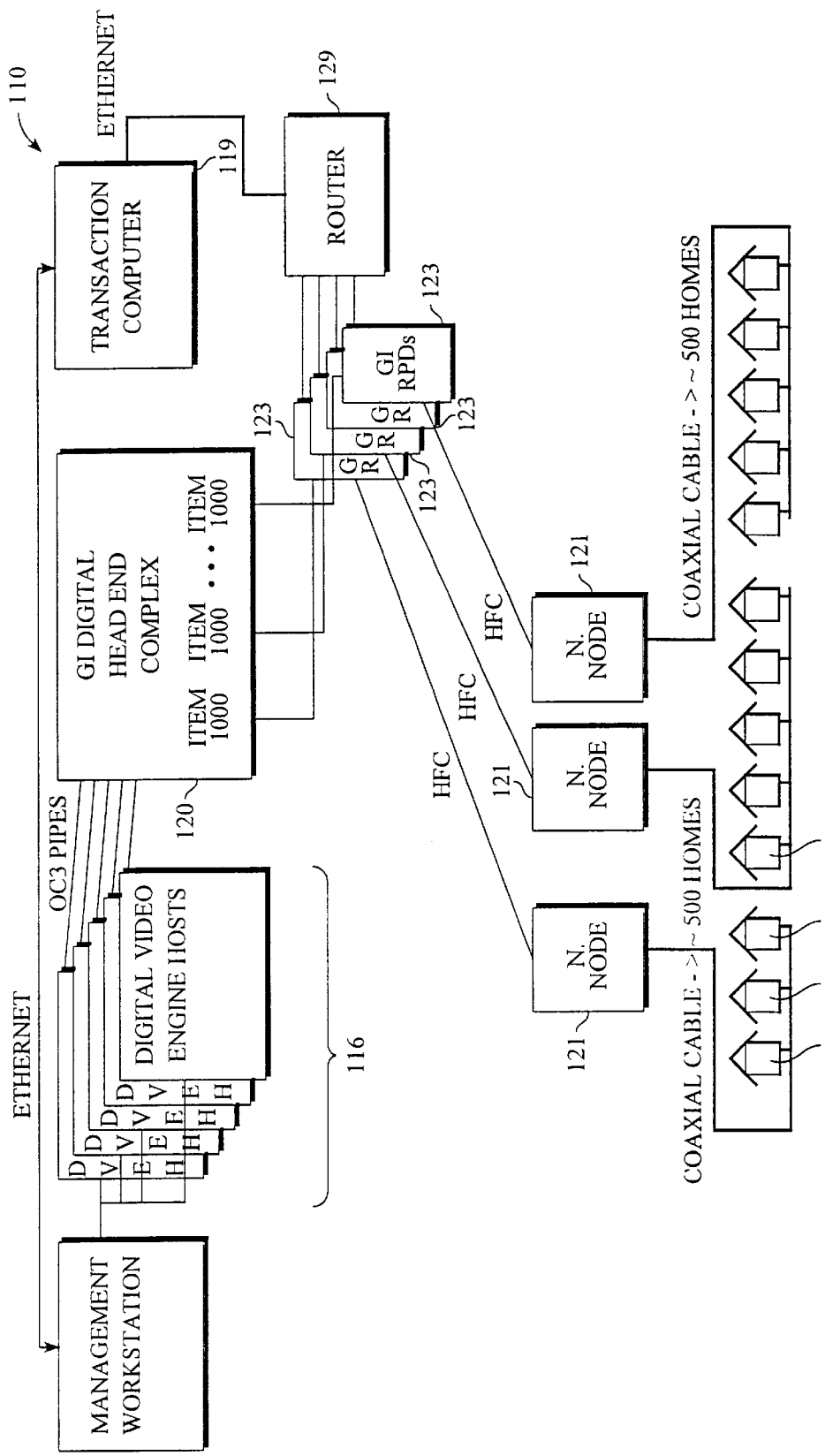
FIG. 8 is a block diagram showing an all demand video architecture in accord with the present invention.

Referring to FIG. 8, the provided maximum flexibility in distributing video programs, an All Demand Video Architecture 110 may be that supports all video transmission techniques multi-session video-on-demand, single-session video-on-demand, near-video-on-demand and scheduled programming. The All Demand Video Architecture 110 may be a software and firmware implementation relying on adaptive algorithms to either optimize movie scheduling for near-video-on-demand, as disclosed in U.S. patent application Ser. No. 09/506,239 which is incorporated herein by reference, or shelf space allocation for video-on-demand as discussed above. The All Demand Video Architecture provides GI Head End Equipment 120 having a library of movies contained therein on multiple fiber optic OC3 channels at 155.52 Mbps per channel, delivering the appropriate movie to the correct user 117 via an internal routing system and controlled by the Management Workstation. The switching does not rely on expensive OC3 switches, rather it employs internal and inherent time division and space division multiplexing to permit any movie to be delivered to any user 117. An N X M SCSI space division switching mechanism is combined with time division multiplexing by the DEHV/VPs 116 over a PCI bus in the Digital Video Engine Hosts.

The All Demand Video Architecture 110 provides content and control to the Head-End equipment. It further permits partitioning and dedicating multiplexors and modulators to different neighborhood nodes 121, and ultimately to different users 117, which is currently not facilitated by existing hardware. The return data path (RPD) 123 from the Set Top Boxes (not shown) of the users (117) to the Head End and All Demand Video Architecture 110 employs standard RPD hardware, but this RPD hardware is now connected to a transaction computer 119, via a router 129 to permit the control of the overall system. In this fashion, the All Demand Video Architecture 110 permits five modes of operation shown in FIGS. 8 and 9.

What is claimed is:

1. A method for storing video programs in a video library in a video-on-demand system, the method comprising:

defining a plurality of dynamic demand parameters, wherein the plurality of dynamic demand parameters includes theater box office sales and sales via the video-on-demand system:

assigning a weighting factor to each of the plurality of dynamic demand parameters;

assigning values to each of the dynamic demand parameters for each of the video programs;

calculating a shelf space value for each of the video programs using the values for the dynamic demand parameters and the weighting factors; and allocating storage space in the video library for each of the video programs based the shelf space value of that video program.

2. The method of claim 1, wherein the plurality of dynamic demand parameters further includes one or more of:

duration of the video program availability to the video-on-demand system;

current time;

current weekday;

current date;

holiday and special event information;

video program genre;

video program ratings by movie reviewers;

studio-imposed minimum shelf space requirements;

operator-imposed minimum shelf space requirements;

operator preferences;

intervening real time events;

number available channels in the video-on-demand system;

scaling factors; and local demographics.

3. The method of claim 1, wherein calculating a shelf space value for each of the video programs comprises:

multiplying the value of each dynamic demand parameter for the video program by the weighting factor for that dynamic demand parameter to generate a weighted value for that dynamic demand parameter; and adding together the weighted values for each of the dynamic demand parameters of the video program to determine the shelf space value for the video program.

4. The method of claim 1, wherein assigning the weighting factor to each of the plurality of dynamic demand parameters comprises adjusting the weighting factors until a desired performance parameter of the video-on-demand system is optimized.

5. The method of claim 4, wherein the desired performance parameter is revenue generation.

6. A video-on-demand system comprising a management workstation for controlling video program storage in the video-on-demand system, the management workstation comprising:

a plurality of adaptive threshold elements for multiplying a set of dynamic demand parameters for each video program by a set of weighting factors to generate a set of weighted demand values for each video program, wherein the set of dynamic demand parameters comprises theater box office sales and sales via the video-on-demand system;

summation logic for adding up the set of weighted demand values for each video program to generate a shelf space value for each video program; and allocation logic for assigning storage space to each video program based on the shelf space value for that video program.

7. The video-on-demand system of claim 6, further comprising iterative logic for adjusting the weighting factors until a desired performance parameter for the video-on-demand system is optimized.

8. The video-on-demand system of claim 6, therein the set of dynamic demand parameters further includes one or more of:

duration of the video program availability to the video-on-demand system;

current time;

current weekday;

current date;

holiday and special event information;

video program genre;

video program ratings by movie reviewers;

studio-imposed minimum shelf space requirements;

operator-imposed minimum shelf space requirements;

intervening real time events;

number available channels in the video-on-demand system;

scaling factors; and local demographics.

* * * * *